United States Patent [19]

MacLeod et al.

[11] Patent Number: 5,777,949

[45] Date of Patent: Jul. 7, 1998

[54] TRAJECTORY MATCHED PASSIVE DETECTION SYSTEM

[75] Inventors: Robert B. MacLeod, Newport, R.I.; Walter T. Schneider, New Bedford, Mass.

[73] Assignee: The United States of America as represented by the Secretary of the Navy, Washington, D.C.

[21] Appl. No.: 787,834

[22] Filed: Jan. 23, 1997

[51] Int. Cl.⁶ ........................................... H04B 1/06
[52] U.S. Cl. ............................................ 367/136; 367/124
[58] Field of Search .................................. 363/136, 135, 363/125, 124, 130, 129

[56] References Cited

U.S. PATENT DOCUMENTS 5,481,505  1/1996  Donald et al. ................ 367/124

Primary Examiner—Daniel T. Pihulic
Attorney, Agent, or Firm—Michael J. McGowan; William F. Eipert; Prithvi C. Lall

[57] ABSTRACT

A passive target detection system for use with a moving platform which includes a module for postulating modeled target signals based upon a number of factors including at least one factor selected from the group consisting of signal beam pattern, frequency, non-linear signal progression and carrier movement; a receiver for receiving signals from a target; and a comparison unit for comparing the signals with the modeled target signals, for determining location of the target.

15 Claims, 2 Drawing Sheets

TRAJECTORY MATCHED PASSIVE DETECTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention is directed toward target detection systems, and more particularly, to a passive target detection system and method which takes into consideration the beam pattern of the detection system sonar array as well as the non-linear rate at which tonals progress due to Doppler effect and movement of the detection system carrier.

(2) Description of the Prior Art

The prior art includes both passive and active underwater detection systems. Since active systems can be detected by a target or enemy due to a radiated ping from the source, it is preferred that passive detection systems be used. For passive systems, a signal is detected from the target and used to direct a detection system carrier, such as a torpedo, to the target.

Several prior art patents discuss both passive and active target detection systems. However, each of the following patents suffers from one or more disadvantages which limits their ability to effectively and accurately detect targets.

U.S. Pat. No. 4,975,886 to Ellingson discloses a detecting and ranging system which uses hydrophones for detecting compressional waves emitted by a sound source. While a passive system is disclosed, it fails to take into account Doppler effects and the pattern of motion of the system carrier which eventually is to be directed to the target. Accordingly, the accuracy of the system suffers.

U.S. Pat. No. 5,341,347 to Ludwig discloses an electro-acoustic target searching system for torpedoes. The system comprises a receiving transducer means capable of receiving signals at a first, second or third frequency based upon the magnitude of the signal. Although a passive system is disclosed, the system is only capable of receiving and processing signals at one frequency at a time.

U.S. Pat. No. 5,251,185 to Baggenstoss discloses a sonar signal processor and display system. This system combines the use of both coherent and incoherent signal processors. In addition to a conventionally used matched filter detection processor, an incoherent signal processor, comprising a cross range energy filter and a down range energy filter, is used. The pattern of the system carrier and Doppler effects are apparently not taken into account in determining the coordinates of targets, and therefore, a degree of detection accuracy is lost.

U.S. Pat. No. 3,798,590 to Jacobson et al. discloses a signal processing apparatus including Doppler dispersion correction means in connection with active sonar return signal processing. The apparatus includes a signal generator providing an inverse replica of the signal which is shifted upwardly in frequency and is transmitted as a sonar signal.

Additional patents of interest are U.S. Pat. No. 5,251,186 to Lockwood disclosing a preprocessor and adaptive beam former for linear frequency modulation active signal; U.S. Pat. No. 4,754,282 to Edelblute et al. disclosing an improved data analysis system; U.S. Pat. No. 5,157,615 to Brodegard et al. disclosing an aircraft traffic alert and collision avoidance device; U.S. Pat. No. 4,549,184 to Boles et al. disclosing a moving target ordinance control; U.S. Pat. No. 5,245,587 to Hutson disclosing a multi-dimensional signal processing and display system; and U.S. Pat. No. 5,337,053 to Dwyer disclosing a method and apparatus for classifying targets.

While each of these patents disclose systems, methods or devices directed to target detection, none of these patents disclose an all encompassing passive target detection system which takes into account the beam pattern of the detection system sonar array and non-linear rate that tonals progress due to Doppler effects as well as movement of the system carrier.

In currently known target detection systems, such as those discussed above, the models for generating matching signals simplify to a linear model, consider only one tonal or frequency, and/or neglect the beam pattern of the detection system tonal array, thereby leading to reduced accuracy in subsequent matching. Accordingly, error in estimating target position occurs.

There exists a need, therefore, for a passive target detection system which takes into account the beam pattern of the detection system sonar array, the non-linear rate at which tonals progress due to Doppler effects and the movement of the detection system, which utilizes a plurality of tonals and which operates over a wide frequency band.

SUMMARY OF THE INVENTION

The primary object of this invention is to provide a passive target detection system having improved target modeling ability.

Another object of this invention is to provide a passive target detection system which takes into account Doppler effects and motion of the detection system carrier in modeling target signals.

Yet another object of this invention is to provide a passive target detection system which operates over a wide frequency band and thereby provides enhanced detection accuracy.

A further object of this invention is to provide a process for passive target detection.

These and other objects and advantages disclosed herein are achieved by the passive target detection system of the present invention. The system is preferably used with a moving target detection system carrier. The system comprises means for postulating modeled target signals based upon a number of factors including at least one factor selected from the group consisting of signal beam pattern, frequency, non-linear signal progression and carrier movement; means for receiving signals from a target; and means for comparing said signals with said modeled target signals for determining location of said target.

In further accordance with the invention, a process for detecting a target with a passive target detection system and a moving target detection system carrier is provided which method comprises the steps of postulating modeled target signals based upon at least one factor selected from the group consisting of signal beam pattern, frequency, non-linear signal progression and carrier movement; receiving signals from a target; and comparing said signals with said modeled target signals for determining location of said target.

BRIEF DESCRIPTION OF THE DRAWINGS

A more complete understanding of the details of the system and process of the present invention are set forth in the following description and the accompanying drawings in which like reference numerals depict like elements and wherein:

FIG. 1a is a schematic view of a system in accordance with the invention; and

DETAILED DESCRIPTION OF THE PREFERRED EMBODIMENTS

Figure 1:
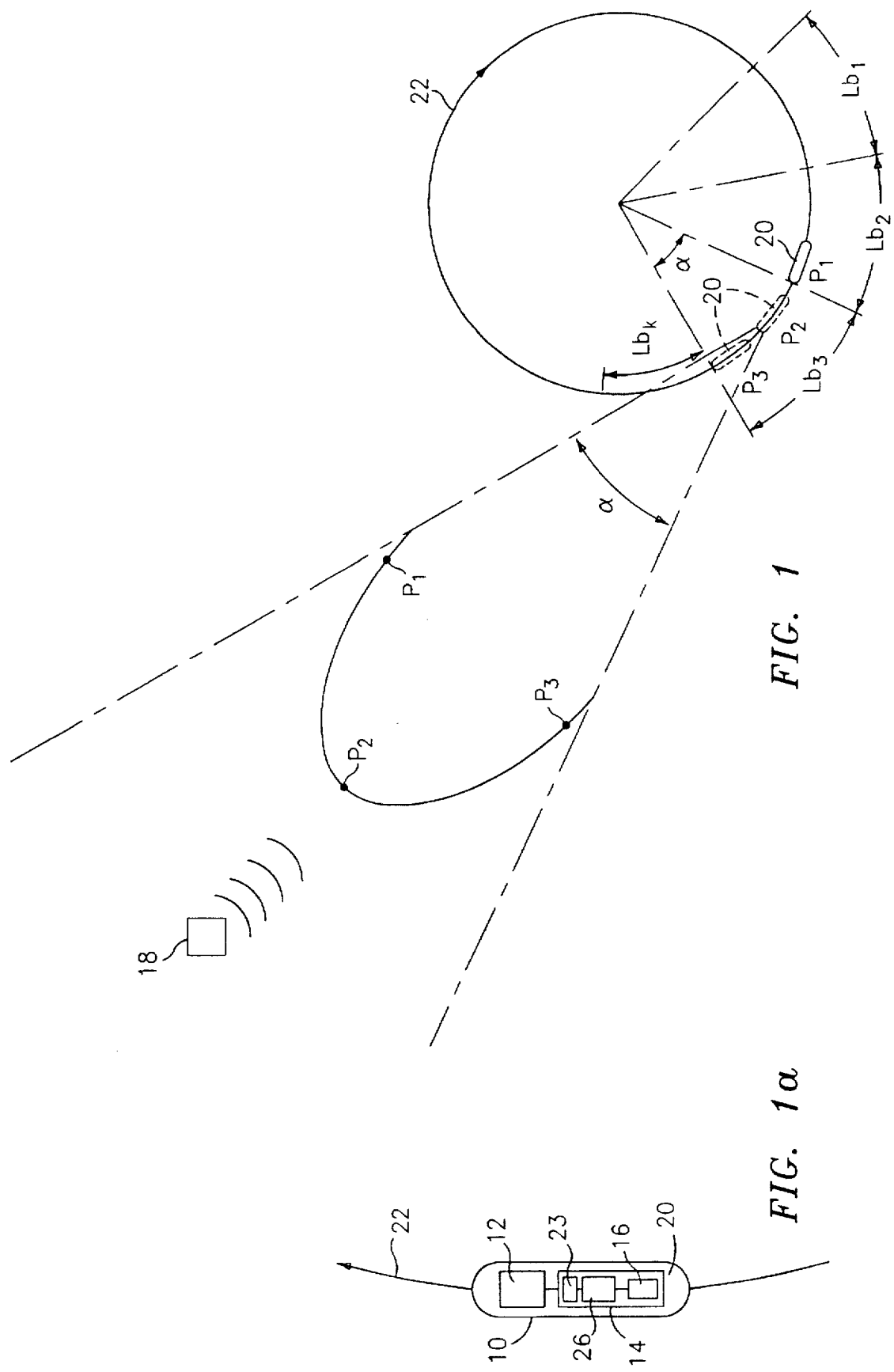
FIG. 1 is an overall schematic view of the passive target detection system in use with a system carrier and in accordance with the principles of the present invention.

Referring now to the drawings in detail, there is shown in FIGS. 1 and 1a, a schematic diagram of a passive detection system in accordance with the principals of the present invention, which is designated generally as 10. System 10 generally includes an array of receivers 12, a processor 14 for postulating or modeling target signals, and a plurality of matched filters 16 operatively associated with processor 14.

Signals of measurable frequencies are received by the array of receivers 12 from a distant target 18, which array of receivers 12 are positioned on a detection system carrier 20 as indicated in the diagram of FIGS. 1 and 1a, for example, a torpedo or submarine. In a typical situation, the carrier 20 moves in a pattern relative to the target, for example in a circular pattern as shown by the dotted line representation of the carrier 20, while signals are received by the array of receivers 12. The pattern 22 is preferably circular although other patterns can be used, for example, a spiral pattern. Data is calculated and analyzed in accordance with the process set forth below via processor 14, which may be hardware, software modules, or a combination of hardware and software. From the data and typically in conjunction with a guidance system or the like, a torpedo, submarine or other device requiring target detection can passively detect the location of a target.

In accordance with the invention, system 10 serves to postulate a series of modeled target signals, and to receive signals from target 18, whereby received signals are compared to the modeled signals so as to determine the presence and location of a target 18. According to the invention, and advantageously, system 10 serves to model target signals taking into account at least one and preferably a number of factors selected from the group consisting of signal beam pattern, frequency, non-linear signal progression and movement of carrier 20.

System 10 in accordance with the invention is preferably adapted to postulate matched filters for a series of k signals corresponding to or spaced over a range of signal frequencies or tonals received by receivers 12. It is preferred to process a series of tonals distributed over the entire frequency range, however, a subset or non-continuous set of tonals may be processed in accordance with the invention. By considering the foregoing factors in signal postulating, and performing matched filters for a series of signal frequencies or tonals, system 10 in accordance with the present invention serves to provide enhanced accuracy of signal modeling and, thereby, more accurate detection, location and classification of targets.

Figure 2:
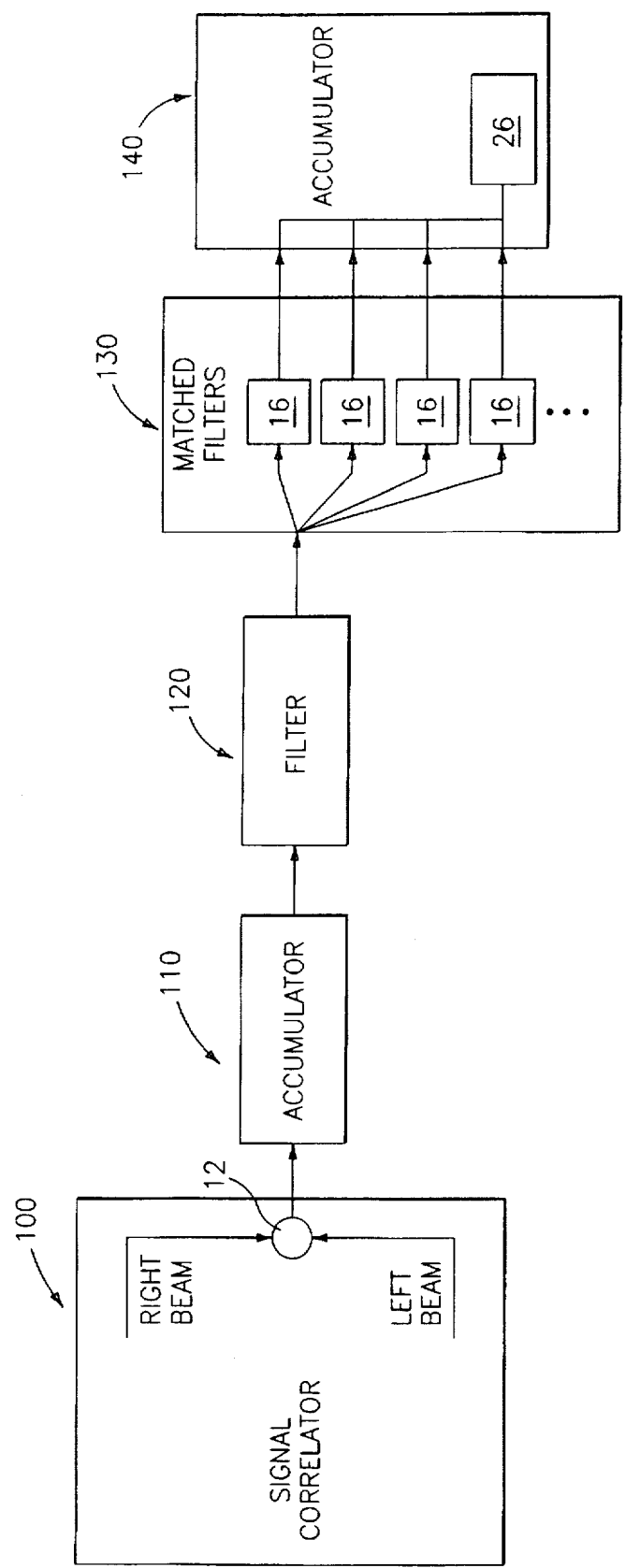
FIG. 2 is a schematic view of the process of the passive target detection system in accordance with the principals of the present invention.

Referring to FIG. 2, the process of the present invention will now be further described. FIG. 2 shows, schematically, a signal correlator 100, an accumulator 110, a filter 120 and matched filters 130 which are operatively associated and serve in accordance with the present invention to process data points received by receivers 12 and provide indication as to detection of a target. Processor or accumulator 140 serves to further process or "post process" data from filters 120, 130 so as to determine the location of a particular target.

Referring to correlator 100, receivers 12 may typically receive a plurality of signal elements, which are formed by system 10 into beams, typically through right and left apertures (not shown) of carrier 20. The corresponding left and right beams contain time series data points from the sonar array of the carrier. The data is combined to generate a single received signal, for example by cross correlating the data streams point by point. Cross correlation between left and right channels can for example be accomplished by conjugating one data stream and multiplying in accordance with standard signal processing techniques. Receivers 12 and processor 14 are preferably adapted so as to provide the received signal in batches of data points selected to equal the beam width for that particular sonar array. This advantageously allows for matched filters to be run at each tonal or signal frequency selected within the beam width.

As set forth above, system 10 postulates modeled target signals against which received signals are correlated so as to obtain data which is indicative of target location and other useful information.

System 10 in accordance with the present invention models signals as follows. Signals R are modeled as the sum over k of k tonals ($R_{kk}$), and can be determined as follows:

$$R = \Sigma R_{kk} = \Sigma A_k^2 * e^{-i*2\pi*f_k\tau} \qquad (1)$$

wherein $A_k^2$ is power and is given by $$A_k^2 = b^2(\theta_0 - \theta); \qquad (2)$$

$f_k$ is the frequency of each tonal and is given by $$f_k = f_{o,k}*(1+V_r/c*\cos(\theta_0-\theta)); \qquad (3)$$

τ is correlation delay (sec) and is given by $$\tau = d/c*\sin(\theta_0-\theta) \qquad (4)$$

and wherein:

b is a batch length ($L_b$) by 1 vector of beam weights;

θ is the carrier azimuth heading;

$\theta_0$ is the carrier heading at middle of current batch;

$f_{o,k}$ is the $k^{th}$ tonal's base frequency (Hz);

$V_r$ is the carrier velocity (ft/sec);

c is the speed of sound (ft/sec); and d is the aperture spacing (ft).

As set forth above, the motion of carrier 20 carrying system 10 is taken into account in accordance with the present invention so that noise and other extraneous signals generated by carrier 20 can be detected and removed from consideration. Thus, carrier azimuth heading θ is preferably determined as a function of turn rate as follows:

$$\theta = \zeta*t \qquad (5)$$

wherein ζ is carrier turn rate in degrees per second and t is time (sec).

Carrier heading ($\theta_0$) in the middle of the current batch is preferably determined as follows:

$$\theta_0 = \theta - \left(\frac{B.W.}{2}\right) \quad (6)$$

wherein B.W. is the beam width in degrees (adaptation parameter), and $\theta$ is the carrier heading at the end of the batch.

Modeling signals in accordance with the above provides R, the resulting modeled target correlation, which is used in subsequent matched filter analysis so as to determine the position of a target as desired. This modeling is preferably carried out by processor 14 as hardware designed for the purpose or operating software or code 23 (FIG. 1a) for the purpose, or software modules, or combinations of hardware and software as desired.

Samples of data points are gathered for processing in batches over batch lengths ($L_b$) as follows:

$$L_b = \frac{B.W.}{\zeta} * f_6 \quad (7)$$

wherein $f_s$=sampling rate in samples per second.

As set forth above, it is preferred that the system and process in accordance with the present invention receive signals at different tonals distributed over the band width for receivers 12, and that target signals be modeled at each of these tonals. Since each term progresses at a different electrical phase rate even when the terms may be coming from the same angle, the use of matched filters at more than one tonal serves to greatly enhance the accuracy of detection in accordance with the present invention.

Also as set forth above, a further advantage of the present invention is the consideration of the movement rate of carrier 20 in the process of modeling signals. Considering carrier movement during modeling signals is advantageous in accordance with the invention since this consideration allows background noise and other non-target signals which may be generated by carrier 20 to be eliminated since such signals will have the same movement component as carrier 20. Thus, by filtering for carrier movement, attention can be and is focused on signals meeting other filters and which are relatively stationary with respect to carrier 20.

Finally, and referring back to FIG. 1, the signal modeling process set forth above is further advantageous in that beam patterns are more accurately modeled by avoiding substantially square beam pattern estimates of the prior art processes discussed above. In FIG. 1, the beam pattern is more accurately modeled as shown, with points P1, P2, P3 being locations at which source or target 18 appears along a particular beam pattern. As shown in FIG. 1, angle $\alpha$ is the degree of coverage of the beam pattern for a particular circle segment, and also equals the arc of a circle traversed corresponding to the beam pattern. According to the invention, a number of batches of points may be received by receivers 12 for various lengths $L_b$ along the perimeter of carrier pattern 22. Thus, as shown in FIG. 1, lengths $L_{b1}$, $L_{b2}$ and $L_{b3}$ would correspond to three batches of points.

Referring back to FIG. 2, accumulator 110 gathers signals from correlator 100 for processing in batches which equal one traversal through the beam pattern. Each batch represents an entire sweep of a proposed target through the beam pattern of the array, wherein the sweep preferably includes a section of approximately 45° as indicated by angle a in FIG. 1.

At filter 120, received signals and modeled target signals are then windowed by a normalized beam pattern, preferably in accordance with the following equation:

$$x(i) = r(i) * b(i)^2 \quad (8)$$

wherein:

x is the length ($L_b$) by 1 vector of weighted correlation samples;

r is the length ($L_b$) by 1 vector of correlation samples; and b is the length ($L_b$) by 1 vector of beam weights.

Still referring to FIG. 2, data from filter 120 is then passed to a comparison unit with matched filters 130 wherein received signals or data streams, after having been gathered into batches, are matched to a series of modeled signals as represented by the following:

$$l_k = x^t * h_k \quad (9)$$

wherein $l_k$ is the $k^{th}$ test statistic, or statistic for the $k^{th}$ tonal;

the superscript t indicates the hermitian transpose; and $h_k$ is the match filter for the $k^{th}$ tonal.

The matched filter sinusoid ($h_k$) with frequency $f_{0,k}$ modulated in a non-linear fashion can then be determined as follows:

$$h_k = \exp(-i*2\pi f_{0,k} * [1 + V_c/c*\cos\psi]*d/c*\sin\psi) \quad (10)$$

wherein $f_{0,k}$ is the $k^{th}$ tonal base frequency (Hz); and $\psi$ is the angle traversed for the data points in a particular batch, and can be determined as follows:

$$\psi = B.W.*(-1/2 + 1/L_b, -1/2 + 2/L_b, \ldots, 0, \ldots, 1/2)^t \quad (11)$$

It should be apparent that by modulating each frequency of the signals or data stream with processor 14 performing steps as above, that modulation is carried out in a non-linear fashion such that each filter yields a complex test statistic which represents the degree of matching between the signal received by receivers 12 and the postulated or modeled target signals prepared by system 10 as set forth above. Preferably, postulated frequencies are preselected while actual responses are calculated on line since such responses are dependent upon carrier turn rate.

Accumulator 140 preferably stores test statistics for post processing for further analysis in connection with target identification and location. Post processing may be carried out so as to determine a total test statistic or sum (l) as follows:

$$l = \Sigma |l_i|^2 \quad (12)$$

wherein $l_i$ is the test statistic for a batch.

Also, real and imaginary parts of the coherent sum can be determined as follows:

$$l_{re} = \Sigma Re(l_i) \quad (13)$$

$$l_{im} = \Sigma Im(l_i) \quad (14)$$

wherein $Re(l_i)$, $Im(l_i)$ are the real and imaginary parts of the coherent sum.

Test statistics are preferably stored in a computer memory 26 associated with processor 14, as illustrated in FIGS. 1a and 2. Each test statistic includes several parts as set forth above, that is the accumulated or total power l the accumulated real part $l_{re}$ and the accumulated imaginary part $l_{im}$ which are calculated as set forth above on a batch by batch basis.

Of course, other accurate test statistics may be postulated. However, batch power is the primary test statistic determined by processor 14 and/or code 23. Batch power is used for target detection and is viewed as a time series by linking the batches. Batch power can be thresholded by an adaptive normalizer included with matched filter 16 which need not be causal, for providing an adaptive signal threshold after the pattern is complete, for use in predicting future values for estimating or postulating the signal. Test statistics stored in computer memory 26 are preferably used for determining the adaptive signal threshold.

In accordance with the foregoing, it should be apparent that a system and process have been provided for passive target detection having improved target modeling ability and, accordingly, improved accuracy. The system and process of the present invention model target signals based upon a number of factors including signal beam pattern, non-linear rate of progression of a tonal due to Doppler effects and torpedo movement, and the like. Furthermore, signals are modeled for a plurality of tonals distributed over a wide band width, thereby providing further enhanced accuracy of the system and process of the present invention.

The primary advantage of this invention is that a passive target detection system is provided having improved target signal modeling ability. Another advantage of this invention is that a passive target detection system is provided which takes into account both Doppler effects and system carrier patterns in determining position of a target. Another advantage of this invention is that a passive target detection system is provided including a receiver for receiving signals from a passive target which system takes into account the motion of the receiver for enhancing signal detection. Still another advantage of this invention is that a passive target detection system is provided which is capable of non causal operation. Still another advantage of this invention is that a passive target detection system is provided which preferably stores at least one cycle of detected parameters for more accurately determining the location of the target.

It is apparent that there has been provided in accordance with this invention a trajectory matched passive detection system and process which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A passive target detection system for use with a moving target detection system carrier, comprising:

means for postulating modeled target signals based upon a number of factors including frequency and at least one factor selected from the group consisting of signal beam pattern, non-linear signal progression and carrier movement;

means for receiving signals from a target; and means for comparing said received signals with said modeled target signals for determining location of said target.

2. The system according to claim 1, wherein said means for receiving comprises a plurality of transducers responsive to acoustic signals over a range of signal frequencies; and wherein said means for postulating generates a series of k modeled target signals distributed over said range of signal frequencies, wherein k is greater than or equal to 2.

3. The system according to claim 1, wherein said means for postulating postulates said modeled target signals based upon factors including each of signal beam pattern, non-linear signal progression and carrier movement.

4. The system according to claim 1, wherein said means for comparing comprises matched filter means for correlating said received signals with said modeled target signals.

5. The system according to claim 1, wherein said means for receiving comprises an array of receivers adapted to receive signal elements over a plurality of angular sectors of prescribed size and further comprising means for interleaving said signal elements received over said plurality of angular sectors to provide said signals.

6. The system according to claim 1, wherein said means for receiving comprises means for receiving tonals, and wherein said means for postulating comprises means for postulating modeled target tonals.

7. A passive target detection system for use with a moving detection system carrier, comprising:

means for postulating modeled target signals, wherein said modeled target signals (R) are modeled as the sum over k of k tonals ($R_{kk}$) given by:

$$R = \Sigma R_{kk} = \Sigma A_k^2 * e^{-i^*2\pi^*f_k\tau}$$

wherein $A_k^2$ is power, $f_k$ is the frequency of the $k^{th}$ tonal, and $\tau$ is a correlation delay;

means for receiving signals from a target; and means for comparing said received signals with said modeled target signals for determining location of said target.

8. The target detection system of claim 7 wherein:

said power ($A_k^2$) is given by $A_k^2 = b^2(\theta_0 - \theta)$, where $b^2$ is a vector of beam weights, $\theta$ is carrier heading and $\theta_0$ is carrier heading at the middle of a processing batch;

said frequency of the $k^{th}$ tonal ($f_k$) is given by $$f_k = f_{o,k}*(1+V_t/c*\cos(\theta_0-\theta))$$

where $f_{o,k}$ is the base frequency of the $k^{th}$ tonal, $V_t$ is velocity of said carrier and c is the speed of sound; and said correlation delay $\tau$ is given by $$\tau = d/c*\sin(\theta_0-\theta)$$

where d is an aperture spacing of said means for receiving.

9. The target detection system of claim 8 wherein said carrier heading $\theta$ is given by $\theta=\zeta t$, where $\zeta$ is carrier turn rate and t is time.

10. A process for detecting a target with a passive target detection system and a moving target detection system carrier, comprising the steps of:

postulating modeled target signals based upon at least one factor selected from the group consisting of signal beam pattern, non-linear signal progression and carrier movement;

receiving signals from a target; and comparing said signals with said modeled target signals for determining location of said target.

11. The process of claim 10, wherein said step of receiving further comprises receiving said signals over a range of signal frequencies, and wherein said step of postulating comprises postulating a series of k modeled target signals distributed over said range of signal frequencies, wherein k is greater than or equal to 2.

12. The process of claim 11, wherein said step of postulating comprises postulating said modeled target signals based upon factors including each of signal beam pattern, non-linear signal progression and carrier movement.

13. The process according to claim 10, wherein said step of comparing comprises correlating said signals with said modeled target signals using matched filters.

14. The process according to claim 10, wherein said step of receiving comprises receiving signal elements over a plurality of angular sectors of prescribed size, and interleaving said signal elements to provide said signals.

15. The process according to claim 10, wherein said step of receiving comprises receiving tonals, and wherein said step of postulating comprises postulating modeled target tonals.

* * * * *